(12) United States Patent
Wakita et al.

(10) Patent No.: US 11,325,671 B2
(45) Date of Patent: May 10, 2022

(54) HEADLIGHT AND STRADDLE TYPE VEHICLE

(71) Applicant: HONDA MOTOR CO., LTD., Tokyo (JP)

(72) Inventors: Hiroyuki Wakita, Tokyo (JP); Haruki Horikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/026,695

(22) Filed: Sep. 21, 2020

(65) Prior Publication Data

US 2021/0094645 A1    Apr. 1, 2021

(30) Foreign Application Priority Data

Sep. 30, 2019  (JP) .............................. JP2019-180641

(51) Int. Cl.
| | |
|---|---|
| *B62J 6/026* | (2020.01) |
| *B62J 6/024* | (2020.01) |
| *F21S 41/36* | (2018.01) |
| *B62J 6/20* | (2006.01) |
| *F21W 102/13* | (2018.01) |

(52) U.S. Cl.
CPC ............. *B62J 6/026* (2020.02); *B62J 6/024* (2020.02); *B62J 6/20* (2013.01); *F21S 41/36* (2018.01); *F21W 2102/13* (2018.01)

(58) Field of Classification Search
CPC ..... B62J 6/02; B62J 6/024; B62J 6/026; B62J 6/20; F21S 41/36; F21S 41/147; F21S 41/335; F21V 7/0025; F21V 7/0033; F21V 7/0041; F21V 7/0083
See application file for complete search history.

(56) References Cited

U.S. PATENT DOCUMENTS

| | | | |
|---|---|---|---|
| 2004/0125610 A1* | 7/2004 | Lekson | F21S 41/33 362/487 |
| 2006/0193143 A1* | 8/2006 | Ohira | B60Q 1/0035 362/473 |
| 2008/0055918 A1* | 3/2008 | Mascadri | F21S 41/321 362/475 |

(Continued)

FOREIGN PATENT DOCUMENTS

| | | | | |
|---|---|---|---|---|
| JP | 2018-116808 A | | 7/2018 | |
| JP | WO 2019/064797 | * | 4/2019 | ............... B62J 6/00 |
| WO | WO 2016/159893 | * | 10/2016 | ........... B60Q 1/0041 |

*Primary Examiner* — Zheng Song
(74) *Attorney, Agent, or Firm* — Thomas | Horstemeyer, LLP (57) ABSTRACT

The present invention provides a headlight provided on a front side of a vehicle and configured to illuminate the front side of the vehicle, including a first board provided with a first light source, a second board provided with a second light source, and a reflecting portion provided between the first board and the second board, wherein the reflecting portion includes a first reflector configured to reflect light from the first light source, and a second reflector configured to reflect light from the second light source, the first board and the second board are arranged to face each other while sandwiching the first reflector and the second reflector, and a space irradiated with the light from the first light source and a space irradiated with the light from the second light source define one continuous space.

10 Claims, 5 Drawing Sheets

(56) References Cited

U.S. PATENT DOCUMENTS

| | | | |
|---|---|---|---|
| 2008/0144328 A1* | 6/2008 | Yagi | F21V 29/75 |
| | | | 362/516 |
| 2008/0225535 A1* | 9/2008 | Mochizuki | F21V 29/76 |
| | | | 362/466 |
| 2011/0249459 A1* | 10/2011 | Hatta | F21S 41/151 |
| | | | 362/509 |
| 2014/0071705 A1* | 3/2014 | Kouchi | F21S 41/39 |
| | | | 362/517 |
| 2014/0321138 A1* | 10/2014 | Takenaka | F21S 41/147 |
| | | | 362/511 |
| 2018/0264993 A1* | 9/2018 | Takenaka | B62J 6/01 |

* cited by examiner

HEADLIGHT AND STRADDLE TYPE VEHICLE

CROSS-REFERENCE TO RELATED APPLICATION

This application claims priority to and the benefit of Japanese Patent Application No. 2019-180641 filed on Sep. 30, 2019, the entire disclosure of which is incorporated herein by reference.

BACKGROUND OF THE INVENTION

Field of the Invention

The present invention relates to a headlight and a straddle type vehicle.

Description of the Related Art

As disclosed in Japanese Patent Laid-Open No. 2018-116808, a vehicle represented by a motorcycle generally includes a lighting device, that is, a so-called headlight including a low-beam lamp, a high-beam lamp, a position lamp, and the like and configured to illuminate the front side of the vehicle. Since the headlight is an important component necessary for making the vehicle safely travel at night, the amount (brightness) of light emitted from the headlight, that is, light that illuminates the front side of the vehicle needs to meet at least a standard defined by laws.

To ensure more safety, the headlight is required to increase the amount of light that illuminates the front side of the vehicle without increasing the number of parts and the cost. Particularly for a high beam, the request to increase the light amount tends to be more conspicuous because the lighting distance is longer than that of a low beam.

SUMMARY OF THE INVENTION

The present invention provides a headlight advantageous in increasing the amount of light that illuminates the front side of a vehicle.

According to one aspect of the present invention, there is provided a headlight provided on a front side of a vehicle and configured to illuminate the front side of the vehicle, including a first board provided with a first light source, a second board provided with a second light source, and a reflecting portion provided between the first board and the second board, wherein the reflecting portion includes a first reflector configured to reflect light from the first light source and guide the light to the front side of the vehicle, and a second reflector configured to reflect light from the second light source and guide the light to the front side of the vehicle, the first board and the second board are arranged to face each other while sandwiching the first reflector and the second reflector, and a space irradiated with the light from the first light source and a space irradiated with the light from the second light source define one continuous space.

Further objects, features and advantages of the present invention will become apparent from the following detailed description of the embodiments of the present invention with reference to the accompanying drawings.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
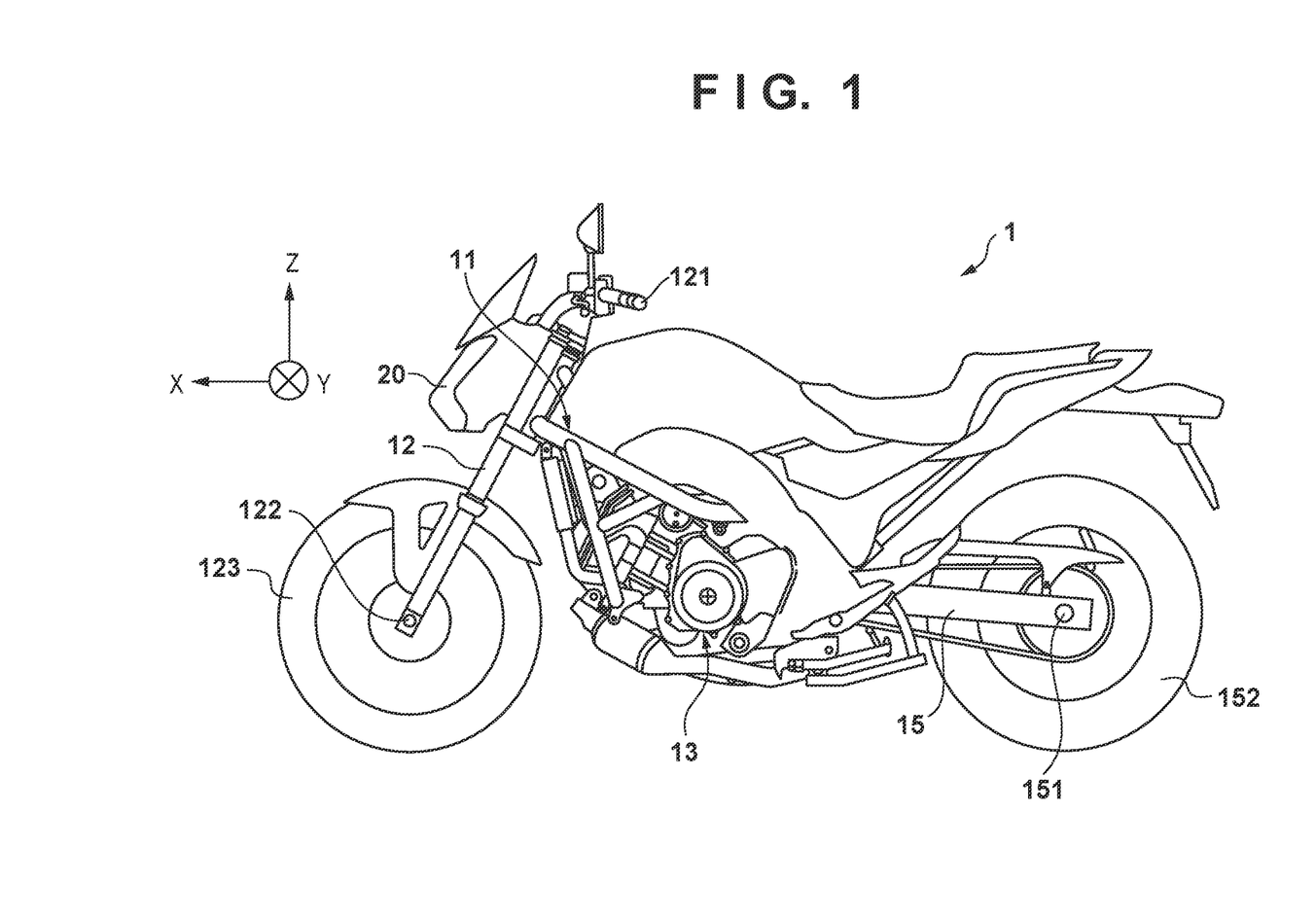
FIG. 1 is a schematic side view showing a straddle type vehicle according to an aspect of the present invention.

FIG. 1 is a schematic side view showing a straddle type vehicle 1 according to an aspect of the present invention. The straddle type vehicle 1 is a vehicle on which a driver rides, and is embodied as a motorcycle. Note that in the drawings including FIG. 1, an arrow X indicates the front-and-rear direction of the straddle type vehicle 1, an arrow Y indicates the vehicle width direction of the straddle type vehicle 1, and an arrow Z indicates the vertical direction of the straddle type vehicle 1.

As shown in FIG. 1, the straddle type vehicle 1 includes a vehicle body frame 11 that is the skeleton of the vehicle, a front fork 12 supported by the vehicle body frame 11, and engine 13, a seat 14, a swing arm 15, and a headlight 20.

The vehicle body frame 11 includes, for example, a head pipe that steerably supports the front fork 12, a main frame obliquely extending from the lower portion of the head pipe to the lower rear side, a center frame extending downward from the rear end portion of the main frame, a seat rail extending from the rear end portion of the main frame to the upper rear side, a down frame obliquely extending from the front end portion of the main frame to the lower rear side, and an upper frame extending from the upper portion of the head pipe to the lower rear side up to the main frame.

The front fork 12 supports a bar handle 121 at the upper end portion, and supports a front wheel 123 via an axle 122 at the lower end portion. The engine 13 includes, for example, a crankcase, and a cylinder portion provided to tilt forward from the crankcase. Note that a transmission may be provided integrally with the rear portion of the crankcase. The seat 14 is provided on the upper portion of the seat rail. The swing arm 15 is supported by the center frame to be swingable in the vertical direction, and supports a rear wheel 152 via an axle 151 at the rear end portion.

The headlight 20 is alighting device that is provided on the front (front surface) of the straddle type vehicle 1 and illuminates the front side of the straddle type vehicle 1, for example, the course of the straddle type vehicle 1. In this embodiment, the headlight 20 includes a low-beam lamp, a high-beam lamp, a position lamp, and the like and can switch a lamp to be lighted (optical axis switching). Here, switching of a lamp to be lighted includes, for example, high-beam lamp turn-on and high-beam lamp turn-off. Note that the headlight 20 basically employs an arrangement that always lights the low-beam lamp. However, the present invention is not limited to this.

Figure 2A:
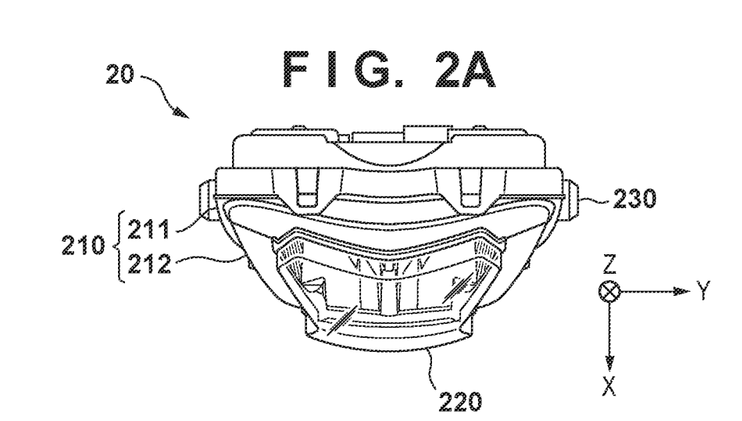
FIGS. 2A to 2D are views for explaining the detailed arrangement of the headlight of the straddle type vehicle shown in FIG. 1.
Figure 2B:
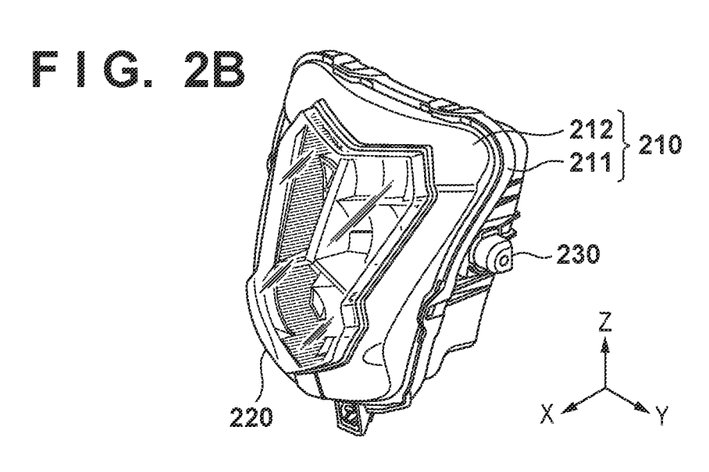
Figure 2C:
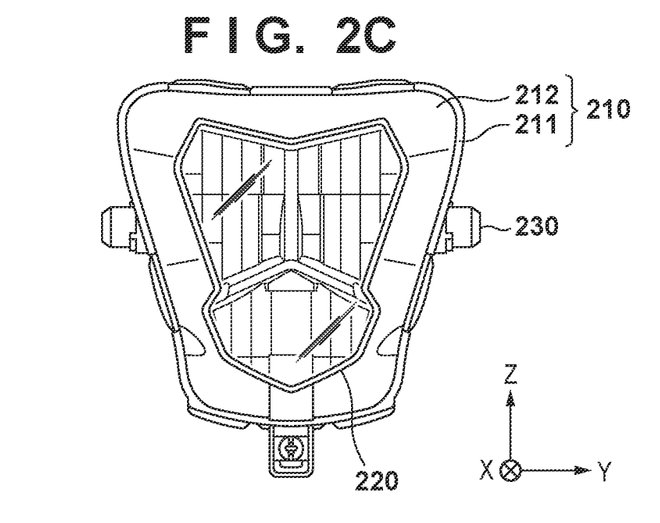
Figure 2D:
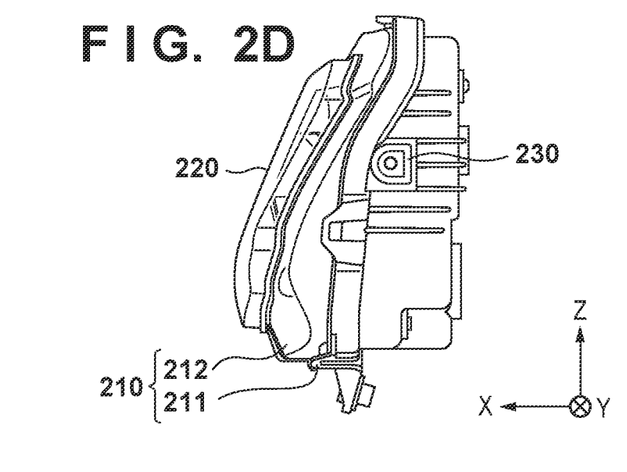
Figure 3A:
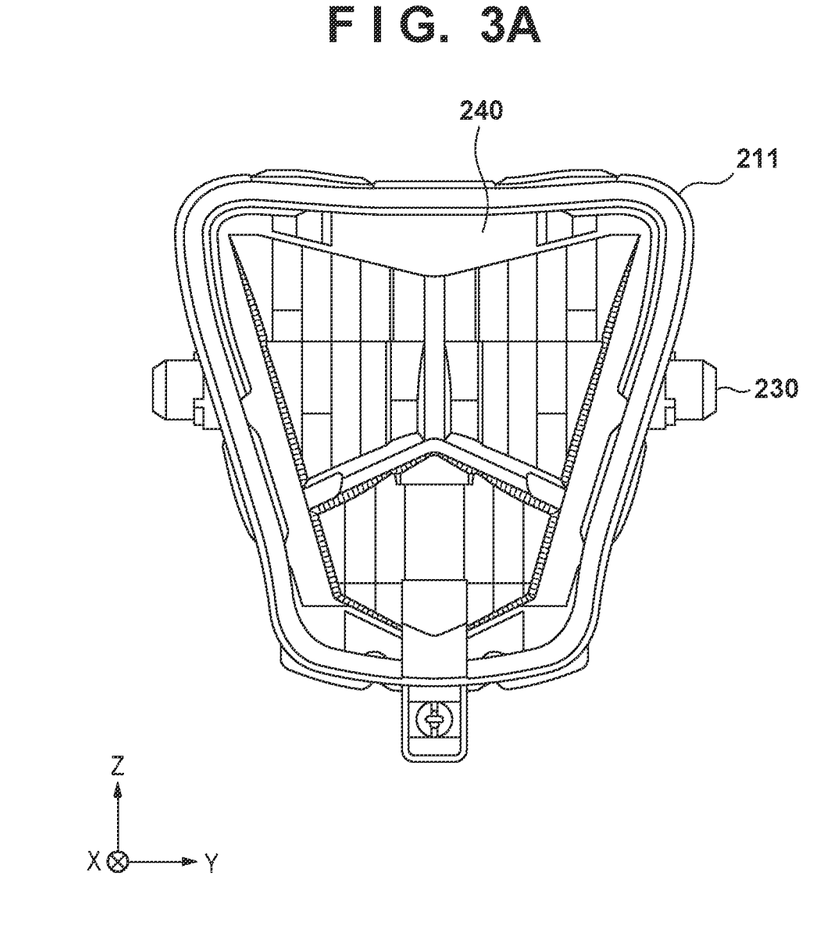
FIGS. 3A and 3B are views for explaining the detailed arrangement of the headlight of the straddle type vehicle shown in FIG. 1.
Figure 3B:
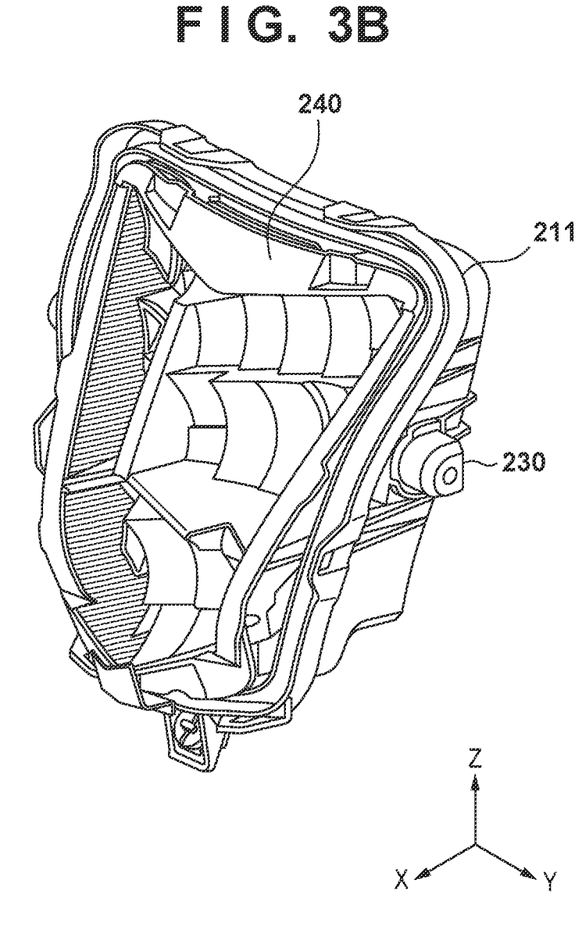

The arrangement of the headlight 20 will be described in detail with reference to FIGS. 2A, 2B, 2C, 2D, 3A, and 3B. FIG. 2A is a top view (X-Y plan view) of the headlight 20, FIG. 2B is a perspective view of the headlight 20, FIG. 2C is a front view (Y-Z plan view) of the headlight 20, and FIG. 2D is a side view (X-Z plan view) of the headlight 20. As shown in FIGS. 2A to 2D, the headlight 20 includes a housing 210, a lens 220, and an attachment member 230. FIGS. 3A and 3B are, respectively, a front view and a perspective view of the headlight 20 from which a cover member 212 of the housing 210 and the lens 220 are removed.

The housing 210 has a function of storing the units of the headlight 20, and in this embodiment, includes a storage member 211 and the cover member 212. As shown in FIG. 2C or 3A, when viewed from the front side of the straddle type vehicle 1, the storage member 211 has an outer shape that increases the length in the vehicle width direction (Y direction) of the straddle type vehicle 1 toward the upper side (+Z direction) of the straddle type vehicle 1, more specifically, an almost trapezoidal shape. As shown in FIGS. 3A and 3B, a reflector unit 240 is attached to the storage member 211. A first board 250, a second board 260, and the like area also attached to the storage member 211, as will be described later. Thus, the storage member 211 stores the reflector unit 240, the first board 250, the second board 260, and the like. The cover member 212 is a cover member that coverts the reflector unit 240, the first board 250, the second board 260, and the like attached to the storage member 211, and is, for example, detachably provided on the storage member 211. The cover member 212 defines a space to store the reflector unit 240, the first board 250, the second board 260, and the like in cooperation with the storage member 211. In addition, an opening is formed in the cover member 212, and the lens 220 is provided in the opening. The lens 220 forms a part of the outer surface of the straddle type vehicle 1. The lens 220 is made of a transparent material that has excellent durability against a weather and an impact from the outside and passes light configured to illuminate the front side of the straddle type vehicle 1. The attachment member 230 is a member provided on the housing 210, for example, on a side surface of the cover member 212 to attach the headlight 20 to the straddle type vehicle 1.

Figure 4A:
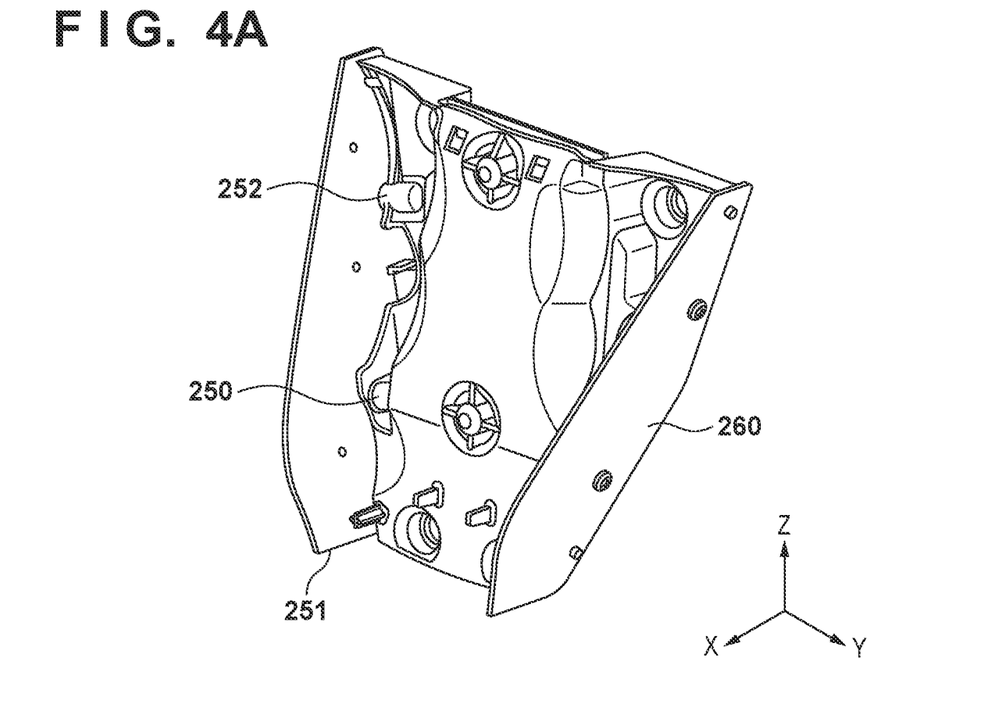
FIGS. 4A and 4B are views for explaining the detailed arrangement of the headlight of the straddle type vehicle shown in FIG. 1.
Figure 4B:
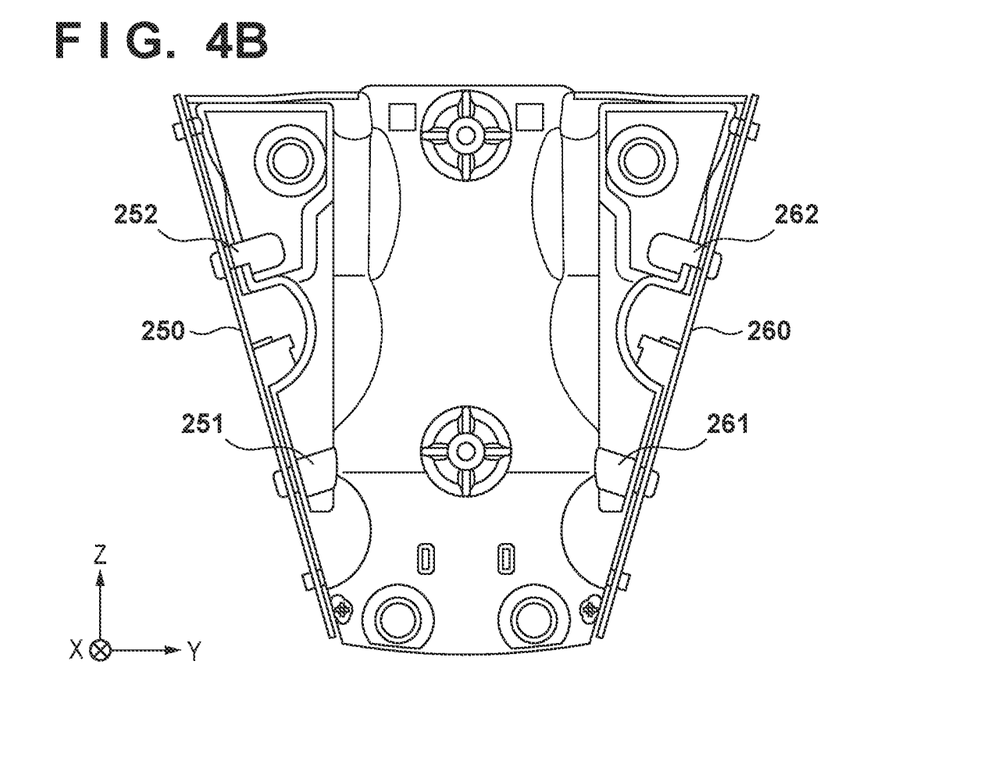

The structures of the first board 250 and the second board 260, which are attached to the storage member 211, will be described in detail with reference to FIGS. 4A and 4B. FIG. 4A is a perspective view of the first board 250 and the second board 260 in a state in which these are attached to the storage member 211, and FIG. 4B is a front view (Y-Z plan view) of the first board 250 and the second board 260 in a state in which these are attached to the storage member 211. As shown in FIG. 4B, the first board 250 is provided with two light sources, that is, a first light source 251 and a third light source 252 different from the first light source 251. Similarly, as shown in FIG. 4B, the second board 260 is provided with two light sources, that is, a second light source 261 and a fourth light source 262 different from the second light source 261. In this embodiment, the first light source 251 and the second light source 261 are high beam light sources, and the third light source 252 and the fourth light source 262 are low beam light sources.

Referring to FIGS. 4A and 4B, the first board 250 and the second board 260 are attached to the storage member 211 so as to be arranged between the reflector unit 240 and the storage member 211. In this embodiment, the first board 250 and the second board 260 are arranged apart in the vehicle width direction (Y direction) of the straddle type vehicle 1 (that is, in an upright position) such that the board surface provided with the first light source 251 and the third light source 252 faces the board surface provided with the second light source 261 and the fourth light source 262. This can implement size reduction of the headlight 20 in the vehicle width direction and provide the excellently designed headlight 20. However, the arrangement of the first board 250 and the second board 260 is not limited to the upright position, and the first board 250 and the second board 260 may be arranged apart in the vertical direction (Z direction) of the straddle type vehicle 1 (that is, in a horizontal position). In this embodiment, each of the first board 250 and the second board 260 is attached to the storage member 211 by a fastening member such as a screw. However, the present invention is not limited to this. For example, each of the first board 250 and the second board 260 may be attached to the storage member 211 by fitting a pawl portion (hole portion) provided on each of the first board 250 and the second board 260 in a hole portion (pawl portion) provided in the storage member 211, or an adhesive may be used.

Figure 5A:
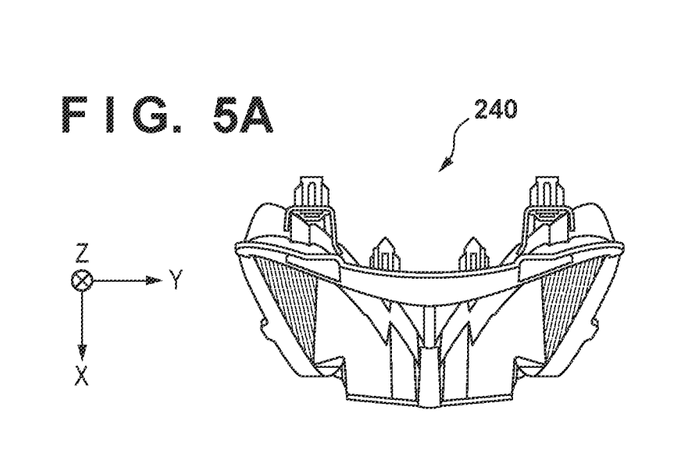
FIGS. 5A to 5D are views for explaining the detailed arrangement of the headlight of the straddle type vehicle shown in FIG. 1.
Figure 5B:
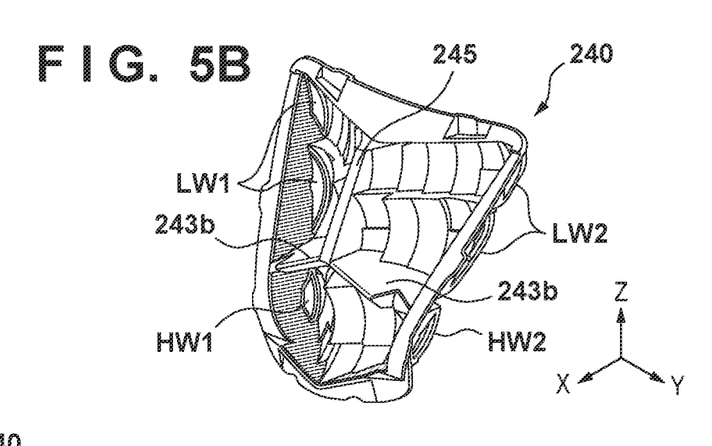
Figure 5C:
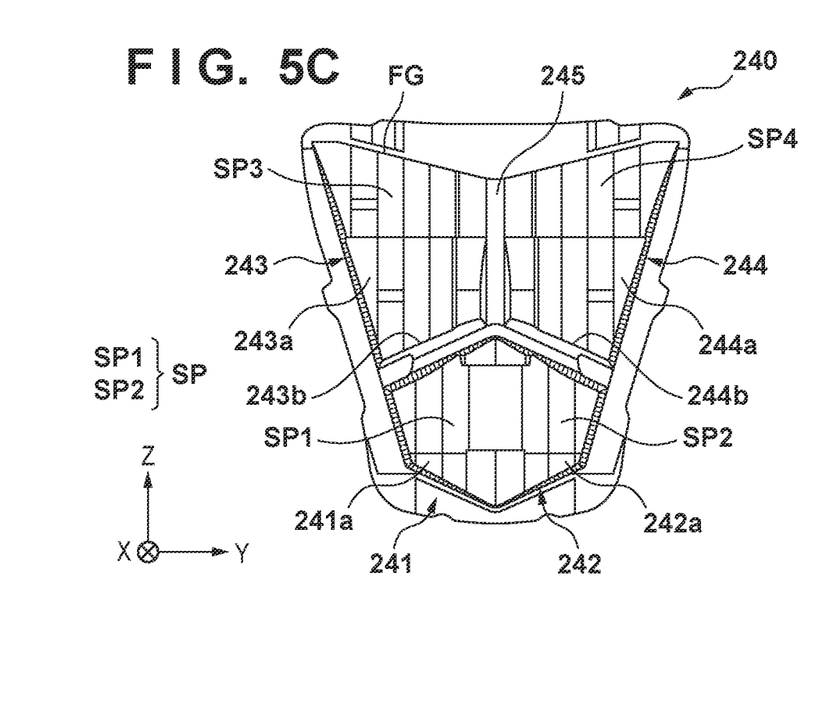
Figure 5D:
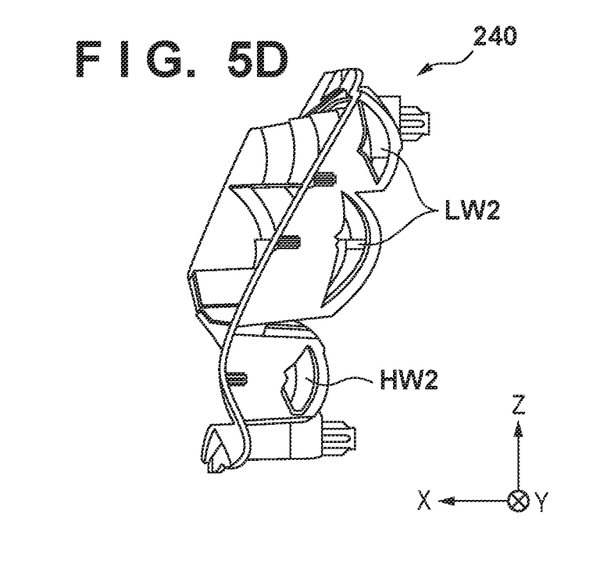

The arrangement of the reflector unit 240 will be described in detail with reference to FIGS. 5A, 5B, 5C, and 5D. FIG. 5A is atop view (X-Y plan view) of the reflector unit 240, FIG. 5B is a perspective view of the reflector unit 240, FIG. 5C is a front view (Y-Z plan view) of the reflector unit 240, and FIG. 5D is a side view (X-Z plan view) of the reflector unit 240. The reflector unit 240 is a reflecting portion that is attached to the storage member 211 and reflects light from each of the first light source 251, the second light source 261, the third light source 252, and the fourth light source 262. The reflector unit 240 is provided to be sandwiched between the two boards including the first board 250 and the second board 260, that is, provided between the first board 250 and the second board 260.

As shown in FIG. 5B or 5D, a first opening window HW1 for a high beam, which is configured to receive (collect) light from the first light source 251, a second opening window HW2 for a high beam, which is configured to receive (collect) light from the second light source 261, a third opening window LW1 for a low beam, which is configured to receive (collect) light from the third light source 252, a fourth opening window LW2 for a low beam, which is configured to receive (collect) light from the fourth light source 262 are formed in the reflector unit 240, and the reflector unit 240 is configured to receive light from each light source to the inside. Note that the positions and the number of the first opening window HW1, the second opening window HW2, the third opening window LW1, and the fourth opening window LW2 shown in FIG. 5B or 5D are merely examples, and are not limited to these if the above-described function can be implemented.

As shown in FIG. 5C, the reflector unit 240 includes a first reflector 241 that reflects light from the first light source 251 and guides it to the front side of the straddle type vehicle 1, and a second reflector 242 that reflects light from the second light source 261 and guides it to the front side of the straddle type vehicle 1. In this embodiment, the first reflector 241 is formed by a plurality of reflecting elements 241a, and the second reflector 242 is formed by a plurality of reflecting elements 242a. Each of the plurality of reflecting elements 241a has a curvature to reflect the light from the first light source 251 and efficiently guide it to the front side of the straddle type vehicle 1. Similarly, each of the plurality of reflecting elements 242a has a curvature to reflect the light from the second light source 261 and efficiently guide it to the front side of the straddle type vehicle 1.

In this embodiment, the first board 250 and the second board 260 are arranged to face each other while sandwiching the first reflector 241 and the second reflector 242, and the spaces where the first reflector 241 and the second reflector 242 are arranged are connected. In other words, the first reflector 241 and the second reflector 242 are connected such that a space SP1 irradiated with the light from the first light source 251 and a space SP2 irradiated with the light from the second light source 261 define one continuous space SP. Hence, if the first light source 251 and the second light source 261, which are high beam light sources, are lighted, light that has leaked from the first light source 251 to the space SP2 can be reflected by the second reflector 242 and guided to the front side of the straddle type vehicle 1, and light that has leaked from the second light source 261 to the space SP1 can be reflected by the first reflector 241 and guided to the front side of the straddle type vehicle 1. That is, it is possible to use the leakage light. Hence, in this embodiment, the light amount of the high beam can be increased as compared to a case in which each of the first reflector 241 and the second reflector 242 forms a single space (that is, in a case in which the space SP and the space SP2 are separated). In other words, in this embodiment, the amount of light from the light sources can be maximized because no gap is formed between the reflector and the reflector as compared to a case in which a space where reflection is impossible exists between the reflector and the reflector (a case in which the first reflector 241 and the second reflector 242 are not connected). Even if one of the first light source 251 and the second light source 261 is not lighted, the light emission area can be ensured by the first reflector 241 and the second reflector 242, and a decrease in the light amount of the high beam can be suppressed.

Additionally, in this embodiment, the first reflector 241 and the second reflector 242 slightly rise to the front side of the straddle type vehicle 1 in the vehicle width direction at the connecting portion. Since the light from the light sources can be reflected to the front side at the slightly rising connecting portion as compared to a case in which the first reflector 241 and the second reflector 242 are connected flat, the amount of light that irradiates the front side of the straddle type vehicle 1 can be increased.

Additionally, in this embodiment, only the first reflector 241 and the second reflector 242 are arranged in the one space SP in which the space SP1 and the space SP2 continue. Hence, since the light that leaks from the first light source 251 to the space SP2 and the light that leaks from the second light source 261 to the space SP1 can be reflected by the second reflector 242 and the first reflector 241, respectively, and guided to the front side of the straddle type vehicle reliably without a loss, the light amount of the high beam can further be increased.

In addition, as shown in FIG. 5C, the reflector unit 240 includes a third reflector 243 that reflects light from the third light source 252 and guides it to the front side of the straddle type vehicle 1, and a fourth reflector 244 that reflects light from the fourth light source 262 and guides it to the front side of the straddle type vehicle 1. In this embodiment, the third reflector 243 is formed by a plurality of reflecting elements 243a, and the fourth reflector 244 is formed by a plurality of reflecting elements 244a. Each of the plurality of reflecting elements 243a has a curvature to reflect the light from the third light source 252 and efficiently guide it to the front side of the straddle type vehicle 1. Similarly, each of the plurality of reflecting elements 244a has a curvature to reflect the light from the fourth light source 262 and efficiently guide it to the front side of the straddle type vehicle 1.

Furthermore, as shown in FIGS. 5B and 5C, the reflector unit 240 includes a wall member 245 that is provided between the third reflector 243 and the fourth reflector 244 and separates a space SP3 irradiated with light from the third light source 252 and a space SP4 irradiated with light from the fourth light source 262. In this embodiment, the wall member 245 other than the third reflector 243 and the fourth reflector 244 exists between the space SP3 and the space SP4. Hence, if the third light source 252 and the fourth light source 262, which are low beam light sources, are lighted, leakage light from each of the third light source 252 and the fourth light source 262 is absorbed by the wall member 245, unlike the high beam, and the leakage light cannot be used. However, since the low-beam lamp basically needs to be always lighted, as described above, if one of the third light source 252 and the fourth light source 262 cannot be lighted, this needs to be specified. Hence, in this embodiment, the wall member 245 is provided between the third reflector 243 and the fourth reflector 244. This makes it possible to specify that the third light source 252 is not lighted in a case in which the light that is guided to the front side of the straddle type vehicle 1 via the third reflector 243 does not exist (that is, in a case in which the third reflector 243 does not function as a light-emitting surface), and specify that the fourth light source 262 is not lighted in a case in which the light that is guided to the front side of the straddle type vehicle 1 via the fourth reflector 244 does not exist (that is, in a case in which the fourth reflector 244 does not function as a light-emitting surface).

Additionally, in this embodiment, the third reflector 243 includes a boundary portion 243b (first portion) that separates the one space SP in which the space SP1 and the space SP2 continue from the space SP3 irradiated with the light from the third light source 252. Similarly, the fourth reflector 244 includes a boundary portion 244b (second portion) that separates the one space SP in which the space SP1 and the space SP2 continue from the space SP4 irradiated with the light from the fourth light source 262. This enables switching between a high beam and a low beam. If the third light source 252 and the fourth light source 262 are lighted, a low beam can be implemented. If the first light source 251 and the second light source 261 are lighted, a high beam can be implemented.

The third reflector 243 is arranged above the first reflector 241 along the vertical direction (the direction orthogonal to the vehicle width direction) of the straddle type vehicle 1, and the fourth reflector 244 is arranged above the second reflector 242 along the vertical direction of the straddle type vehicle 1. In this arrangement, the boundary portion 243b of the third reflector 243 tilts such that the length of the third reflector 243 in the vertical direction of the straddle type vehicle 1 becomes short (that is, the space SP1 becomes wide) as the distance from the first board 250 increases, and the boundary portion 244b of the fourth reflector 244 tilts such that the length of the fourth reflector 244 in the vertical direction of the straddle type vehicle 1 becomes short (that is, the space SP2 becomes wide) as the distance from the second board 260 increases. This can ensure a wide area (light emission area) in each of the first reflector 241 and the second reflector 242 and increase the light amount of the high beam.

Additionally, in this embodiment, when viewed from the front side of the straddle type vehicle 1, a figure FG defined by the first reflector 241, the second reflector 242, the third reflector 243, and the fourth reflector 244 has an outer shape that increases the length in the vehicle width direction (Y direction) of the straddle type vehicle 1 toward the upper side (+Z direction) of the straddle type vehicle 1, more specifically, an almost trapezoidal shape, as shown in FIG. 5C. In this way, the reflector unit 240 has a large width on the upper side where heat generated by light output (emitted) from the first light source 251, the second light source 261, the third light source 252, and the fourth light source 262 is accumulated, thereby improving heat dissipation performance.

According to the headlight 20 of this embodiment, it is possible to increase the amount of light that illuminates the front side of the straddle type vehicle 1 while ensuring safety without increasing the number of parts and the cost. In other words, according to this embodiment, it is possible to provide the headlight 20 advantageous in increasing the amount of light that illuminates the front side of the straddle type vehicle 1.

Summary of Embodiment

1. A headlight according to the above-described embodiment is a headlight (for example, 20) provided on a front side of a vehicle (for example, 1) and configured to illuminate the front side of the vehicle, comprising:

a first board (for example, 250) provided with a first light source (for example, 251);

a second board (for example, 260) provided with a second light source (for example, 261); and a reflecting portion (for example, 240) provided between the first board and the second board, wherein the reflecting portion includes:

a first reflector (for example, 241) configured to reflect light from the first light source and guide the light to the front side of the vehicle; and a second reflector (for example, 242) configured to reflect light from the second light source and guide the light to the front side of the vehicle, the first board and the second board are arranged to face each other while sandwiching the first reflector and the second reflector, and a space (for example, SP1) irradiated with the light from the first light source and a space (for example, SP2) irradiated with the light from the second light source define one continuous space (for example, SP).

According to this embodiment, leakage light from the first light source and the second light source can be used via the first reflector and the second reflector, and the amount of light that illuminates the front side of the vehicle from the first light source and the second light source can be increased.

2. The above-described headlight (for example, 20), wherein the first reflector (for example, 241) and the second reflector (for example, 242) are connected.

According to this embodiment, as compared to a case in which the reflectors are not connected, which is a state in which a space where reflection is impossible exists between the reflector and the reflector, if the reflectors are connected, the amount of light from the light sources can be maximized because no gap exists between the reflector and the reflector.

3. The above-described headlight (for example, 20), wherein only the first reflector (for example, 241) and the second reflector (for example, 242) are arranged in the one space (for example, SP).

According to this embodiment, leakage light from the first light source and the second light source can be guided to the front side of the vehicle reliably without a loss, and the amount of light that illuminates the front side of the vehicle can be increased.

4. The above-described headlight (for example, 20), wherein the first board (for example, 250) and the second board (for example, 260) are arranged apart in a vehicle width direction of the vehicle in a state in which the headlight is provided on the vehicle (for example, 1).

According to this embodiment, it is possible to implement size reduction of the headlight in the vehicle width direction and provide the excellently designed headlight.

5. The above-described headlight (for example, 20), wherein each of the first light source (for example, 251) and the second light source (for example, 261) is a high beam light source.

According to this embodiment, it is possible to increase the light amount of a high beam.

6. The above-described headlight (for example, 20), wherein a third light source (for example, 252) different from the first light source (for example, 251) is provided on the first board (for example, 250).

a fourth light source (for example, 262) different from the second light source (for example, 261) is provided on the second board (for example, 260), and the headlight further comprises:

a third reflector (for example, 243) configured to reflect light from the third light source and guide the light to the front side of the vehicle:

a fourth reflector (for example, 244) configured to reflect light from the fourth light source and guide the light to the front side of the vehicle; and a wall member (for example, 245) provided between the third reflector and the fourth reflector and configured to separate a space (for example, SP3) irradiated with the light from the third light source and a space (for example, SP4) irradiated with the light from the fourth light source.

According to this embodiment, it is possible to specify that the third light source or the fourth light source is not lighted.

7. The above-described headlight (for example, 20), wherein the third reflector (for example, 243) includes a first portion (for example, 243b) configured to separate the one space (for example, SP) in which the space (for example, SP1) irradiated with the light from the first light source (for example, 251) and the space (for example, SP2) irradiated with the light from the second light source (for example, 261) continue from the space (for example, SP3) irradiated with the light from the third light source (for example, 252), and the fourth reflector (for example, 244) includes a second portion (for example, 244b) configured to separate the one space from the space (for example, SP4) irradiated with the light from the fourth light source (for example, 262).

According to this embodiment, it is possible to perform switching between a high beam and a low beam. For example, if the third light source and the fourth light source are lighted, a low beam can be implemented. If the first light source and the second light source are lighted, a high beam can be implemented.

8. The above-described headlight (for example, 20), wherein in the state in which the headlight is provided on the vehicle (for example, 1), the third reflector (for example, 243) is arranged above the first reflector (for example, 241) along a direction orthogonal to the vehicle width direction of the vehicle, in the state in which the headlight is provided on the vehicle, the fourth reflector (for example, 244) is arranged above the second reflector (for example, 242) along the direction orthogonal to the vehicle width direction of the vehicle, the first portion (for example, 243*b*) tilts such that a length of the third reflector in a vertical direction of the vehicle becomes short as a distance from the first board (for example, 250) increases, and the second portion (for example, 244*b*) tilts such that a length of the fourth reflector in the vertical direction of the vehicle becomes short as a distance from the second board (for example, 260) increases.

According to this embodiment, it is possible to ensure a wide area (light emission area) in each of the first reflector and the second reflector and increase the amount of light that illuminates the front side of the vehicle.

9. The above-described headlight (for example, 20), wherein each of the third light source (for example, 252) and the fourth light source (for example, 262) is a low beam light source.

According to this embodiment, it is possible to specify that the third light source or the fourth light source that is a low beam light source is not lighted.

10. The above-described headlight (for example, 20), wherein in the state in which the headlight is provided on the vehicle (for example, 1), a figure (for example, FG) defined by the first reflector (for example, 241), the second reflector (for example, 242), the third reflector (for example, 243), and the fourth reflector (for example, 244) has an outer shape that increases a length in the vehicle width direction of the vehicle toward an upper side of the vehicle.

According to this embodiment, it is possible to make the width large on the upper side where heat generated by light output (emitted) from the light sources is accumulated and improve heat dissipation performance.

11. The above-described headlight (for example, 20), wherein the vehicle includes a straddle type vehicle.

12. A straddle type vehicle according to the above-described embodiment comprising the above-described headlight configured to illuminate the front side of the straddle type vehicle.

According to this embodiment, leakage light from the first light source and the second light source can be used via the first reflector and the second reflector, and the amount of light that illuminates the front side of the vehicle from the first light source and the second light source can be increased.

What is claimed is:

1. A headlight provided on a front side of a vehicle and configured to illuminate the front side of the vehicle, comprising:

a first board provided with a first light source;

a second board provided with a second light source; and a reflecting portion provided between the first board and the second board, wherein the reflecting portion includes:

a first reflector configured to reflect light from the first light source and guide the light to the front side of the vehicle; and a second reflector configured to reflect light from the second light source and guide the light to the front side of the vehicle, the first board and the second board are arranged to face each other while sandwiching the first reflector and the second reflector, a space irradiated with the light from the first light source and a space irradiated with the light from the second light source define one continuous space, the first reflector is arranged in the space irradiated with the light from the first light source and reflects light that has leaked from the second light source to the space irradiated with the light from the first light source, and the second reflector is arranged in the space irradiated with the light from the second light source and reflects light that has leaked from the first light source to the space irradiated with the light from the second light source, a third light source different from the first light source is provided on the first board, a fourth light source different from the second light source is provided on the second board, and the headlight further comprises:

a third reflector configured to reflect light from the third light source and guide the light to the front side of the vehicle;

a fourth reflector configured to reflect light from the fourth light source and guide the light to the front side of the vehicle; and a wall member provided between the third reflector and the fourth reflector and configured to separate a space irradiated with the light from the third light source and a space irradiated with the light from the fourth light source, wherein the third reflector includes a first portion configured to separate the one continuous space in which the space irradiated with the light from the first light source and the space irradiated with the light from the second light source continue from the space irradiated with the light from the third light source, and the fourth reflector includes a second portion configured to separate the one continuous space from the space irradiated with the light from the fourth light source.

2. The headlight according to claim 1, wherein the first reflector and the second reflector are connected.

3. The headlight according to claim 2, wherein only the first reflector and the second reflector are arranged in the one continuous space.

4. The headlight according to claim 1, wherein the first board and the second board are arranged apart in a vehicle width direction of the vehicle in a state in which the headlight is provided on the vehicle.

5. The headlight according to claim 1, wherein each of the first light source and the second light source is a high beam light source.

6. The headlight according to claim 1, wherein in the state in which the headlight is provided on the vehicle, the third reflector is arranged above the first reflector along a direction orthogonal to the vehicle width direction of the vehicle, in the state in which the headlight is provided on the vehicle, the fourth reflector is arranged above the second reflector along the direction orthogonal to the vehicle width direction of the vehicle,
the first portion tilts such that a length of the third reflector in a vertical direction of the vehicle becomes short as a distance from the first board increases, and
the second portion tilts such that a length of the fourth reflector in the vertical direction of the vehicle becomes short as a distance from the second board increases.

7. The headlight according to claim 1, wherein each of the third light source and the fourth light source is a low beam light source.

8. The headlight according to claim 1, wherein in the state in which the headlight is provided on the vehicle, a figure defined by the first reflector, the second reflector, the third reflector, and the fourth reflector has an outer shape that increases a length in the vehicle width direction of the vehicle toward an upper side of the vehicle.

9. The headlight according to claim 1, wherein the vehicle includes a straddle type vehicle.

10. A straddle type vehicle comprising a headlight of claim 1, which is configured to illuminate a front side of the straddle type vehicle.

\* \* \* \* \*